United States Patent [19]

Otto et al.

[11] Patent Number: 4,509,825

[45] Date of Patent: Apr. 9, 1985

[54] DIRECTING AND CONTROLLING THE DISTRIBUTION OF RADIANT ENERGY

[75] Inventors: Stanley W. Otto, Platte City, Mo.; Jack G. Rhoads, Leawood; Michel A. Scrivan, Mission Hills, both of Kans.

[73] Assignee: Hallmark Cards, Inc., Kansas City, Mo.

[21] Appl. No.: 508,523

[22] Filed: Jun. 27, 1983

[51] Int. Cl.[3] .................... G02B 17/00; G02B 27/00

[52] U.S. Cl. .................................... 350/259; 350/263

[58] Field of Search ................ 350/259, 265, 263, 264

[56] References Cited

U.S. PATENT DOCUMENTS 3,423,148 1/1969 Reboul .......................... 350/259 X 4,329,021 5/1982 Bennett et al. ..................... 350/259

FOREIGN PATENT DOCUMENTS 3574 of 1877 United Kingdom ................ 350/265

2608 of 1903 United Kingdom ................ 350/265

OTHER PUBLICATIONS

Industrial Research & Development, Feb. 1983, "R/D News in Brief", p. 43.

Energy & Management, "What Makes Daylighting Effective", Selkowitz, Jun./Jul. 1982.

*Primary Examiner*—Richard A. Wintercorn

*Attorney, Agent, or Firm*—Neuman, Williams, Anderson & Olson

[57] ABSTRACT

The invention is directed to controllably directing radiant light for illumination purposes.

15 Claims, 14 Drawing Figures

FIG. 1
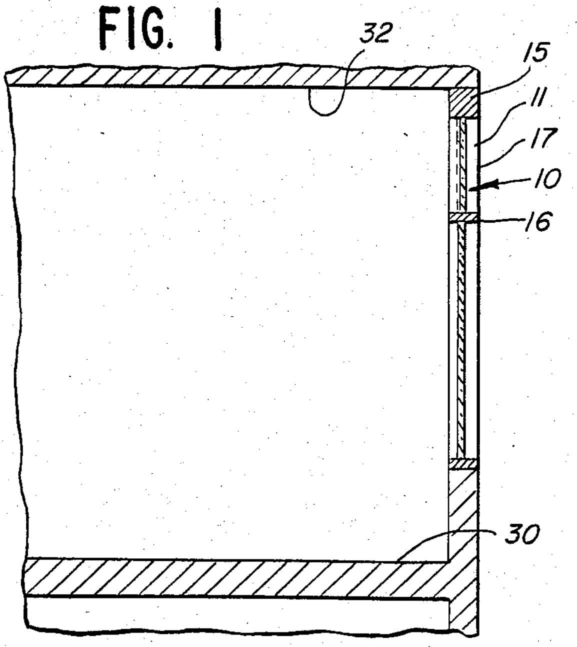
FIG. 2
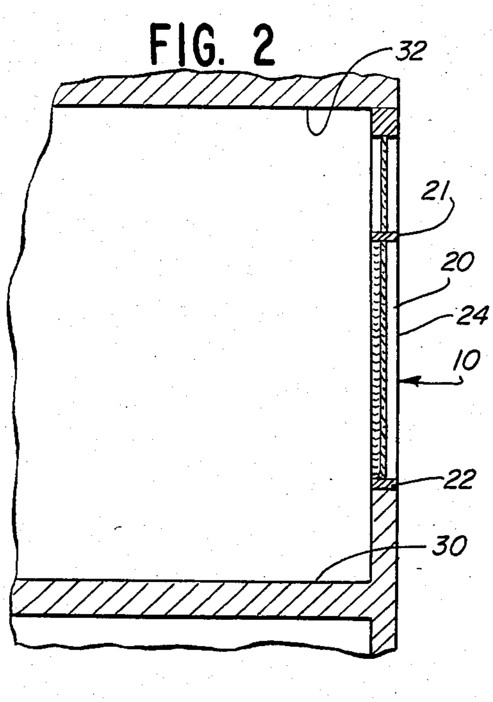
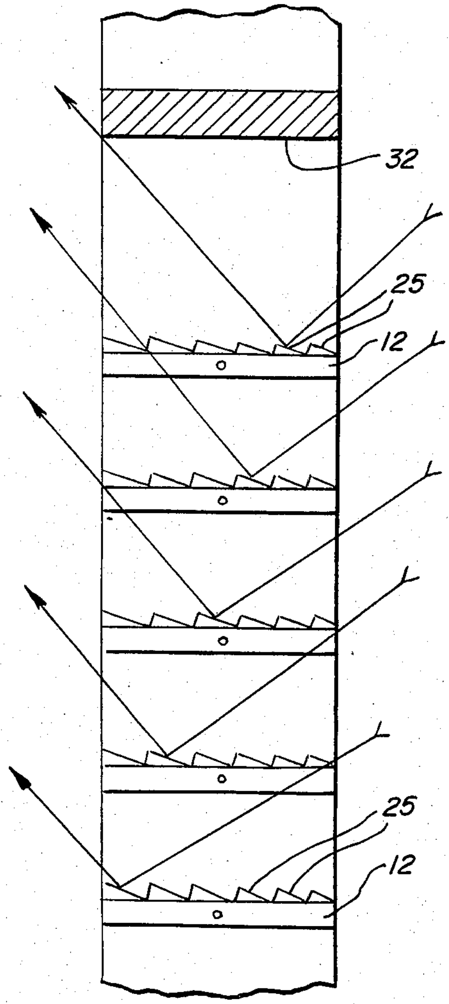
FIG. 3
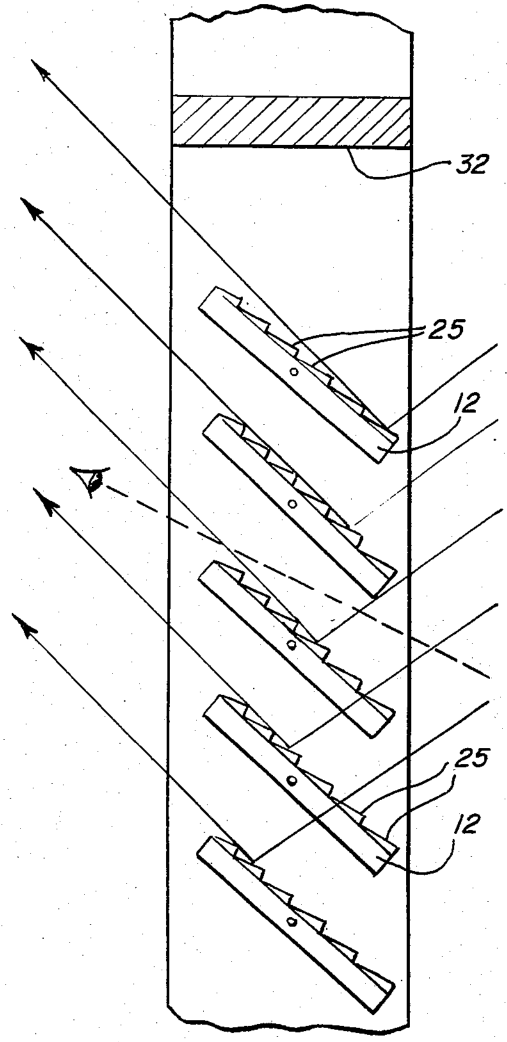
FIG. 4

FIG. 9
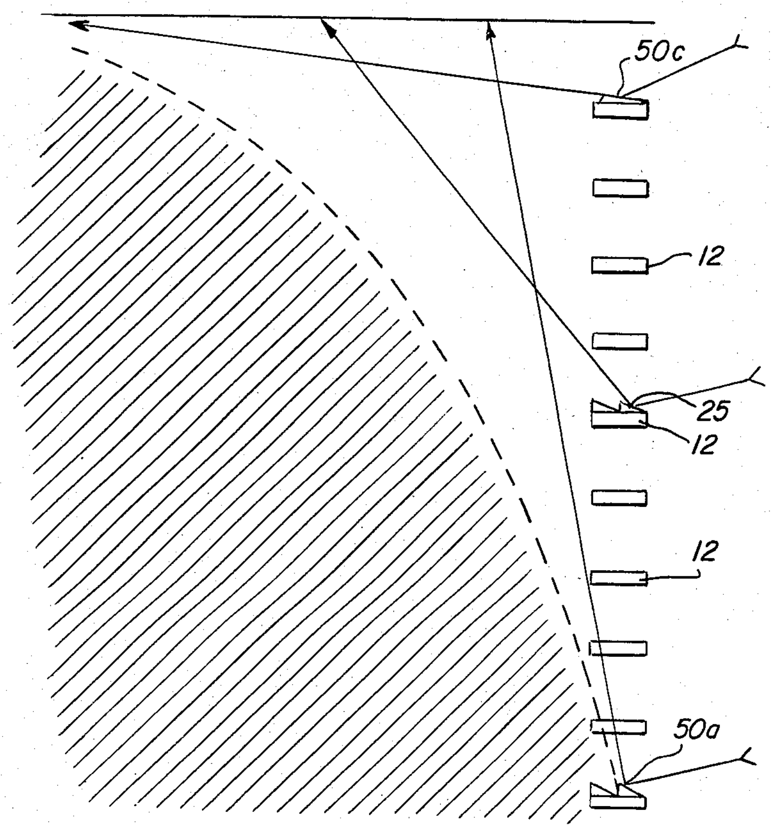
FIG. 5
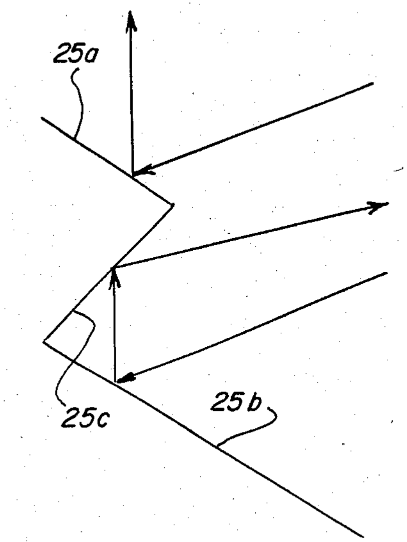
FIG. 12
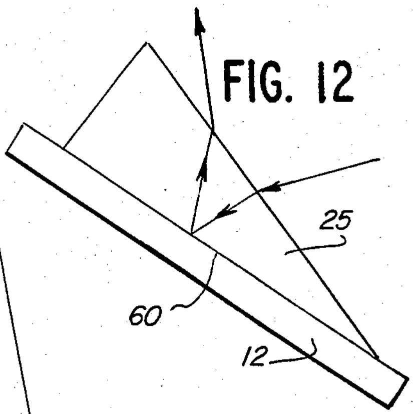
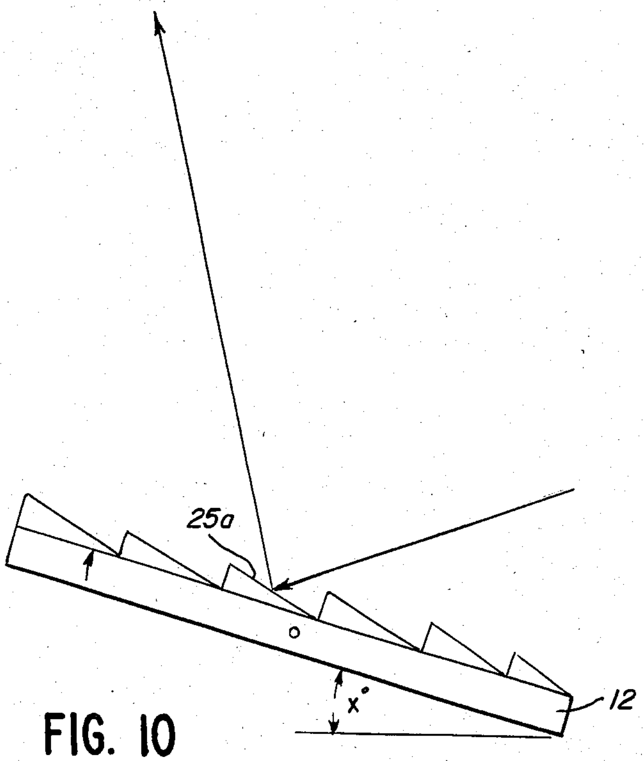
FIG. 10
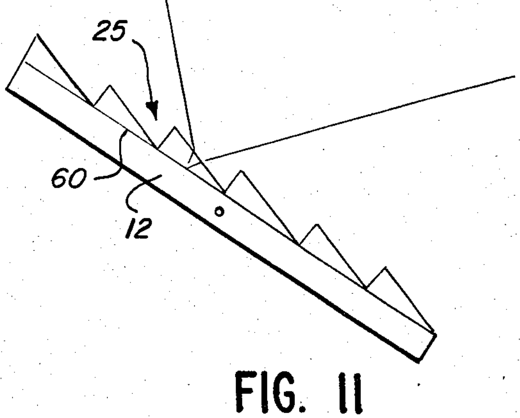
FIG. 11

DIRECTING AND CONTROLLING THE DISTRIBUTION OF RADIANT ENERGY

BACKGROUND OF THE INVENTION

This invention relates to controllably directing radiant light. Effective utilization of sunlight or daylight for illumination of building interiors can afford energy savings by reducing electricity usage. Moreover, by controllably directing the sunlight entering an enclosure it is possible to improve the quality of lighting therein by eliminating undesirable glare and/or high intensity concentration of sunlight in localized areas. However, to be practical from an energy saving standpoint, the means for controlling and directing sunlight so that it can be efficiently utilized for illumination must be of relatively simple construction and have low cost of manufacture. Moreover, such means must be adaptable for use with various size and shapes of building openings through which sunlight enters the building.

In addition to utilization of sunlight for illumination purposes, it is also often desirable to be able to direct in a controlled manner radiant light from other light sources to a desired area for illumination.

SUMMARY OF THE INVENTION

It is a principal object of this invention, therefore, to provide means for controllably directing radiant light for illumination purposes.

It is another object of this invention to provide elements for controllably directing radiant light for illumination purposes.

A further object of the invention is to provide illuminating elements which are of low cost and of simple construction which can be associated with building openings to make use of radiant light for illumination.

Another object of this invention is to provide means for controllably directing sunlight for illumination purposes.

Another object of this invention is to provide elements for controllably directing sunlight for illumination purposes.

Another object of this invention is to provide illuminating elements which are of low cost and of simple construction which can be associated with building openings to make use of radiant sunlight for illumination.

According to one preferred embodiment of this invention, solar energy is controllably directed so as to provide illumination within enclosures such as buildings. This is accomplished by the present invention by providing elements which are adapted for association with enclosure openings penetrable by sunlight, which elements are provided with reflective surfaces and are arranged so as to controllably reflect and direct sunlight. The reflective elements are held by holding means adapted to be positioned adjacent an opening in an enclosure such as a window so that sunlight impinging on the reflecting elements is controllably directed inwardly to provide illumination within the enclosure. The reflecting elements are provided with sunlight reflecting surfaces which are disposed at different angles with respect to the horizontal plane so that the sunlight is reflected in paths of differing angularity whereby the reflected sunlight is controllably directed inwardly and upwardly to a desired target area on the ceiling. Illustratively, an array of sunlight reflecting elements, such as Fresnel lenses, are arranged in the form of a venetian-type blind which is associated with a window of a building, with the reflective elements being so arranged as to reflect incident sunlight inwardly and upwardly to a target area on the ceiling for purposes of illumination.

According to another preferred embodiment of this invention, radiant light is controllably directed from a light source to illuminate a non-lighted area. This is accomplished by the present invention by providing elements which are adapted for association with enclosure openings penetrable by radiant light, which elements are provided with reflective surfaces and are arranged so as to controllably reflect and direct radiant light. The reflective elements are held by holding means adapted to be positioned adjacent an opening in a lighted enclosure such as a window so that radiant light impinging on the reflecting elements is controllably directed from the light source to provide illumination for a non-lighted area. The reflecting elements are provided with light reflecting surfaces which are disposed at different angles with respect to the horizontal plane so that the radiant light is reflected in paths of differing angularity whereby the reflected light is controllably directed to a desired target area. Illustratively, an array of light reflecting elements, such as Fresnel lenses, are arranged in the form of a venetian-type blind which is associated with a window of a building, with the reflective elements being so arranged as to reflect radiant light from a light source within the building to a non-lighted area within or outside of the building.

DESCRIPTION OF THE DRAWINGS

Several illustrative embodiments of the invention will be described in conjunction with the accompanying drawings wherein:

FIG. 1 is a diagrammatic vertical sectional view showing an exterior wall of a room having a window and a transom having associated therewith sunlight directing elements in accordance with this invention.

FIG. 2 is a diagrammatic vertical sectional view similar to FIG. 1 but showing the sunlight directing means according to the invention associated with a window.

FIG. 3 is an enlarged vertical schematic view showing five illustrative sunlight directing elements arranged in accordance with one embodiment of the invention.

FIG. 4 is an enlarged vertical schematic view showing five illustrative sunlight directing elements arranged in accordance with another embodiment of the invention.

FIG. 5 is an enlarged fragmentary view showing the reflectance paths of sunlight from several facets of a sunlight directing element.

FIG. 9 is a schematic view of an alternate arrangement of sunlight directing elements in accordance with another embodiment of the invention.

FIG. 10 is an enlarged fragmentary view of one embodiment of sunlight directing elements in accordance with the invention.

FIG. 11 is an enlarged fragmentary view of another embodiment of sunlight directing elements in accordance with the invention.

FIG. 12 is a fragmentary view of the sunlight directing elements of FIG. 11 showing the reflectance of sunlight therefrom.

DESCRIPTION OF PREFERRED EMBODIMENTS

Figure 7:
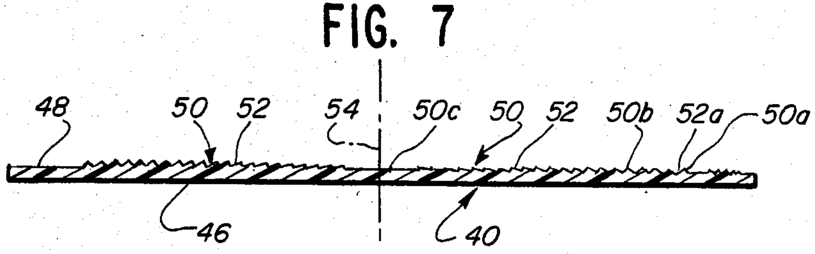
FIG. 7 is a vertical cross-sectional view taken substantially on the line 7—7 of FIG. 6.

In one preferred embodiment of the invention the sunlight reflecting elements comprise an array of Fresnel lens elements which form the top surfaces of a plurality of horizontal louvers or slats arranged in the form of a venetian-type blind 10. Any suitable frame means which is adapted to be positioned near an opening in a building can be utilized to hold the reflecting elements. A venetian blind 10 of conventional type modified so that the surfaces of the horizontal louvers 12 carry a plurality of Fresnel lenses is eminently suitable for use to hold the reflecting elements. The Fresnel reflectors can be secured to the top surface of the louvers in any suitable manner, such as by use of adhesives, stapling, etc.

In the embodiment of the invention illustrated in FIG. 1, the venetian blind 10 is mounted in a transom opening 11 between top and bottom frames 15 and 16 in parallel relationship to glass pane 17 which is transparent to solar radiation. In the embodiment of the invention illustrated in FIG. 2, the blind 10 is mounted in a window opening 20 between top frame 21 and bottom frame 22 adjacent to and parallel with transparent glass pane 24. The blind 10 is mounted in the transom or window openings in conventional manner and can be used with various types of window systems such as double-hung, casement windows and the like. The sunlight reflecting elements in accordance with the invention are positioned adjacent an aperture in a building in any desired manner and thus, for example, can be positioned on the inside or outside of a window opening or between panes of a double window assembly.

The venetian blind 10 is of conventional construction and is comprised of a plurality of horizontally extending louver members 12 vertically spaced one from another. Each individual louver is pivotable about its axis and may be moved by conventional means to accomplish the objects of the present invention. The topmost surface of each of the louvers 12 is provided with a plurality of reflective Fresnel lens 25 which reflect sunlight impinging therefrom upwardly and inwardly at a set angle. In this manner incident sunlight rather than being directed to the floor 30 is reflected at a set angle to impinge upon the ceiling 32 of a room and thus provide a source of illumination. The Fresnel lenses are arrayed on the various louvers of the blind so as to distribute the reflected sunlight over a desired target area of the ceiling.

As illustrated in FIG. 3, the Fresnel lenses 25 are positioned on the blind louvers 12 with the apex of each lens pointing generally inwardly toward the interior of the room, i.e. a left side orientation as viewed. Also, as illustrated, the blind louvers 12 are positioned in a substantially horizontal plane. As seen in FIGS. 3 and 7, the reflecting surfaces or facets of the Fresnel lenses have differing degrees of angularity with respect to the horizontal plane, with the sunlight being reflected toward the ceiling in different angular paths. With the lens facets of greater angularity with respect to the horizontal plane, the sunlight is reflected in a more vertical path toward the ceiling while with lens facets of less angularity the sunlight is reflected in a more horizontal path towards the center of the ceiling. In the drawings, the paths of the incident and reflected sunlight are shown by arrows.

An alternate arrangement of Fresnel lenses 25 on the louvers of a venetian blind is illustrated in FIG. 4. In this latter arrangement, the apex of each lens points generally outwardly away from the room interior, i.e. the lenses have a right side orientation as viewed. Also, as illustrated, the blind louvers 12 themselves are positioned at an angle from the horizontal in a more vertical plane. This arrangement results in the reflected sunlight being reflected over a more limited area of the ceiling with concomitant reduction in glare within the room.

Also, with the arrangement illustrated in FIG. 4, a greater amount of incident sunlight is reflected back out of the room, which may be desired to reduce glare in certain locations or at certain times. When the ridges of the Fresnel lenses are positioned as shown in FIG. 4, a certain percentage of the incident sunlight is reflected away from the interior of the enclosure as illustrated in FIG. 5. Thus, referring to FIG. 5, rays of sunlight striking facet 25*a* on a Fresnel lens is reflected upwardly toward the room ceiling. However, rays of sunlight striking facet 25*b* are reflected therefrom to facet 25*c* from which they are further reflected back out of the room enclosure. Preference for the arrangements of the Fresnel lenses as shown in FIG. 3 or FIG. 4 will depend on the amount of sunlight desired to be admitted for illumination purposes as well as the location of the sunlight directing elements with respect to the angle at which the sun's rays strike the elements. For distribution over a wider ceiling area, the arrangement of FIG. 3 is generally preferred, with this arrangement providing the further advantage of providing greater visibility to the outside through the blind. The arrangement of FIG. 4 offers the advantage of reducing the amount of sunlight reflected into the room and thus reducing the possibility of excessive glare. With the arrangements of FIGS. 3 and 4, it is possible to utilize a particular decoration or decorative design on the bottom surface of each blind louver to enhance or complement the design of the room. Thus, a desired decorative pattern or design could be applied to the bottom surface of each blind louver to provide a decorative appearance. For example, the bottom surface of each louver could carry a portion of a design so that a discrete piece of artwork becomes visible when the louvers are cooperatively arranged at set positions.

Preferred reflecting elements used in accordance with this invention are Fresnel lens type reflectors which are well known. U.S. Pat. No. 4,011,857, the disclosure of which is incorporated herein, relates to the preparation of Fresnel lens reflecting elements which can be advantageously utilized to form the reflecting surfaces in accordance with the present invention. That patent describes an elongated Fresnel lens element comprising a sheet having a series of elongated, generally straight side-by-side, essentially parallel, Fresnel reflecting surfaces, the reflecting surfaces representing segments of a spherical or semi-cylindrical lens member of equivalent length. The Fresnel reflecting surfaces comprise elongated segments which are projected from an imaginary semi-cylinder which passes through the side margins. Although the individual focusing segments, to be exactly representative of a semicylindrical lens, should have curved outer faces in practice, these surfaces can be transversely straight as tangents of such curves if the number of individual segments is sufficiently large to focus solar radiation reflected therefrom to points very close to a line extending along the line represented by an infinite number of end-to-end focal points for the reflector.

Figure 6:
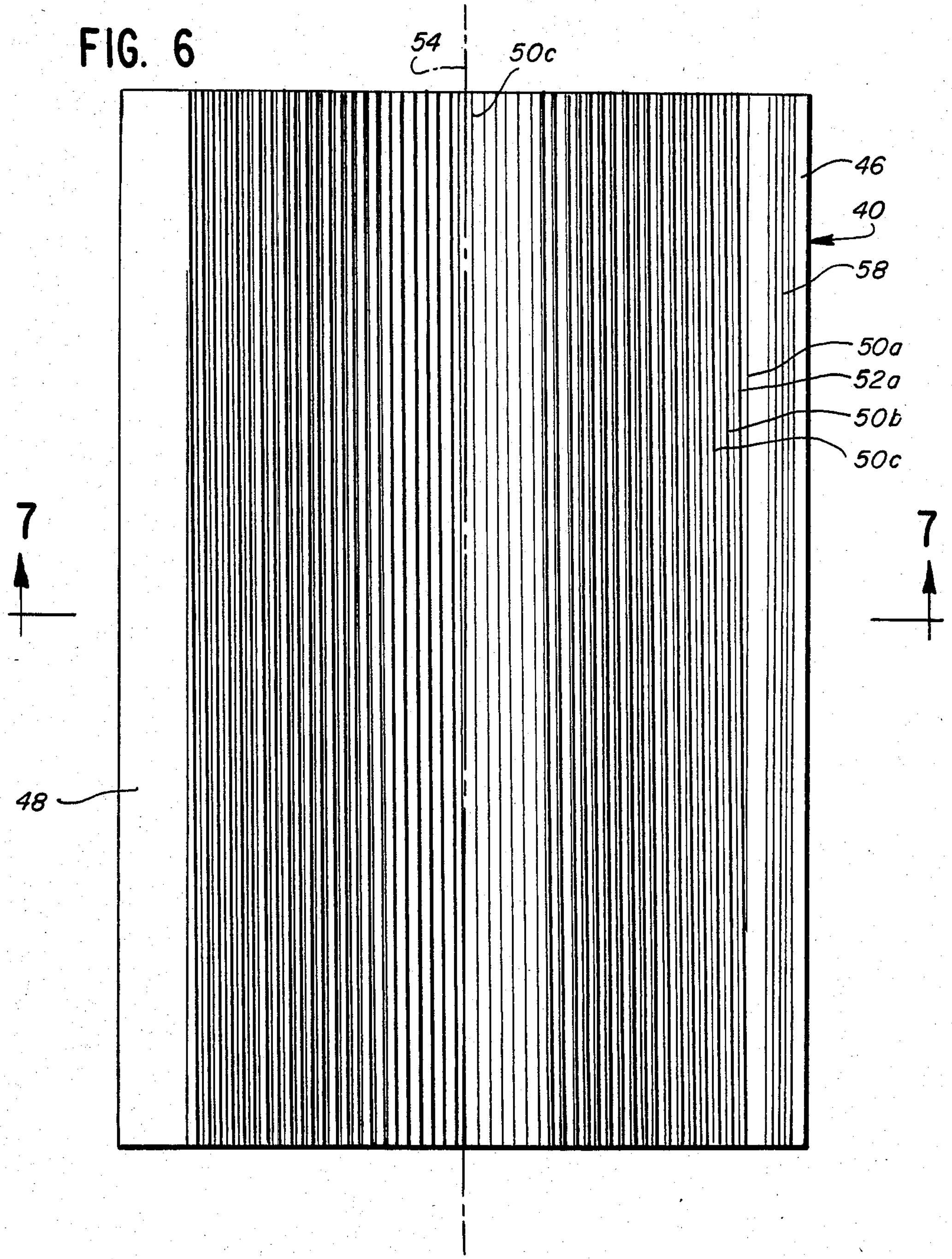
FIG. 6 is a plan view of a sheet element having a series of elongated, generally straight, side-by-side, essentially parallel Fresnel reflecting surfaces which can be used in accordance with the invention.

In the drawings, FIGS. 6 and 7 illustrate a Fresnel lens element formed in accordance with U.S. Pat. No. 4,011,857. Referring to these figures, sheet 40, which can be formed of a resinous material such as a polycarbonate, has a flat face 46 and an opposed grooved side 48. A series of transversely inclined, longitudinally warped focusing surfaces 50 are joined by respective angular faces 52 which extend between adjacent margins of proximal surfaces 50. Viewing the righthand side of the Fresnel element as shown in FIG. 7, it can be seen that the rightmost focusing surface 50*a* is at the greatest angle relative to flat face 46 and is joined to the next adjacent focusing surface 50 by inclined, elongated, longitudinally extending connector face 52*a*. The surfaces 50 successively decrease in relative angularity with respect to flat face 46 as the center line 54 of the reflecting sheet 40 is approached by virtue of the fact that each of the surfaces 50 is configured to be parallel with a projection from corresponding tangents to a semi-cylinder whose end margins are located at the outermost side extremities of the grooved Fresnel defining pattern formed in the side 48 of sheet 40. Thus, the innermost surface 50*c* bisected by center line 54 is essentially flat at the center of the sheet in a longitudinal direction. It is also apparent from FIG. 7 that the groove defining surfaces and faces of reflector sheet 40 are configured and arranged such that the peaks 56 presented by the zones of merger of respective faces 52 with surfaces 50 all lie in a common plane which is substantially parallel to the plane of flat face 46. Any number of reflecting surfaces 50 can be utilized per unit width of the sheet member, depending upon the width of each such surface. The thickness dimension of the sheet member is a function of the angle of the face between the outermost edge reflecting surface and the next adjacent surface and the greater the angle the thicker the sheet blank must be to accommodate such angle. With a sheet 22 inches wide and having 440 angular reflecting surfaces of equal width thickness of approximately 0.05 inch, the sheet can have a thickness no less than 0.07 inch. With such a sheet the outermost reflecting surface 50*a* will have an angularity of about 40° from the flat face 46 while the innermost reflecting surface adjacent the center line will have an angularity of about 6° from the flat face 46.

A series of elongated, transversely V-shaped slit guiding tracks or grooves 58 are also formed in the side 48 of sheet 40 to serve as a guide for a slitting mechanism to remove excess sheet material from opposed side edges of the Fresnel-defining pattern formed in grooved side 48 of the sheet 40. The grooves or tracks 58 are parallel with center line 54 even though surfaces 50 and thereby faces 52 are at an angle with respect to such center line and the groove tracks, by virtue of formation of the Fresnel reflector through utilization of a forming die such as disclosed in U.S. Pat. No. 4,011,857. Tracks 58 also serve as means for orienting a slitter operable to cut the sheet 40 in a direction transversely thereof and at desired locations and to make certain that such cross cuts are in true perpendicular relationship to the center line 54. A mirror face is provided on the Fresnel sheet element to provide the reflective lens. Known vacuum metalizing techniques can be used for the mirror face application. Other known types of Fresnel lens reflecting elements can also be used in accordance with the invention.

Figure 8:
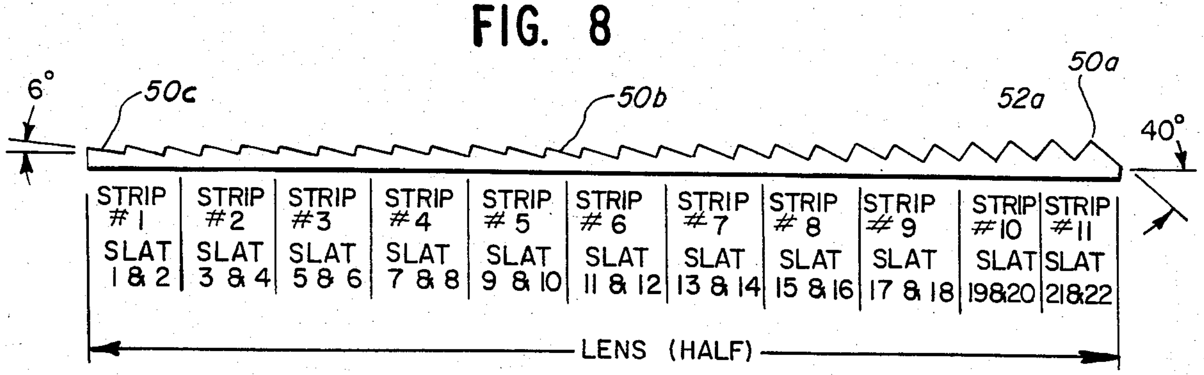
FIG. 8 shows an exemplary arrangement of Fresnel lenses with respect to a series of louvers of a venetian-type blind for a window in accordance with one preferred embodiment.

An illustrative embodiment of the invention is constructed as follows utilizing a conventional venetian blind having 22 horizontal louver members, each one inch wide. A Fresnel sheet element produced in accordance with U.S. Pat. No. 4,011,857 is utilized to provide the Fresnel lens surfaces. This sheet element has a width of 22 inches with 440 angular reflecting surfaces thereon, each being approximately 0.05 inch wide. An illustrative guide for applying strips of the Fresnel lens sheet to louvers is shown in FIG. 8, which shows the relative angularity of the Fresnel reflecting lens for one-half of an entire sheet. Thus, a strip one inch wide of the Fresnel sheet is cut from the righthand side thereof and secured to slats 1 and 2 at the bottom of the venetian blind. The strip is laminated to the slats of the blind by any suitable means, such as by the use of an adhesive or the like. In like manner, strips one inch wide are cut from the Fresnel sheet element in progressive fashion from right to left with each strip being laminated to the remaining louver members in the pattern as shown in FIG. 8 of the drawings. Thus, strip #2 of the Fresnel sheet element is laminated to louvers 3 and 4; strip #3 of the Fresnel sheet element is laminated to louvers 5 and 6; etc. The venetian blind is then mounted in usual manner adjacent to and parallel with a window. Incident sunlight penetrating the window and striking the array of Fresnel lens surfaces is reflected toward the ceiling. The inherent angularity of the Fresnel lens surfaces reflects the incident sunlight as illustrated in FIGS. 3 and 4. Thus, with the pattern of lens application as shown in FIG. 8, the incident rays of sunlight striking the uppermost blind louvers having Fresnel lens surfaces of greater angularity are reflected upwardly to the ceiling at a more acute angle. As the angularity of the Fresnel lenses decreases, the angle of reflectance becomes less acute and thus the lowermost louver members carrying Fresnel lenses of reduced angularity direct the sunlight toward the center of the room at a less acute angle.

In the illustrative embodiment described above, the venetian blind contained 22 slats of such size that by cutting the Fresnel lens sheet into 11 strips each of the top surfaces of the louver members were substantially completely covered by a Fresnel lens surface. With different size venetian blinds, i.e., one containing louvers or slats of different widths, the number of Fresnel lens strips will vary. It will be appreciated that a Fresnel sheet element of greater width and having a greater number of angular reflecting surfaces can be utilized to provide the strips. In such case the sheet will, of necessity, be of greater thickness and the outermost Fresnel surfaces of the sheet will have greater angularity with respect to the flat surface thereof. The size (width) of the Fresnel sheet element to utilize so as to provide a desired number of Fresnel lens strips will thus depend on the width and number of louver members making up the venetian blind. This can be readily determined for a given application. In order to obtain dispersion of the reflected rays of sunlight over the greatest area of the ceiling, there should be a maximum degree of angularity between the Fresnel lens surfaces on the top louvers of the venetian blind and the Fresnel lens surfaces on the lowermost louvers of the venetian blind. The Fresnel lens surface need not be applied to each blind louver but can be applied to every second or third louver, if desired, with corresponding reduction in illumination. The blind louvers can be rotated axially during the sun's movement to maintain the highest degree of reflection of the sunlight to the ceiling. Moreover, each of the blind louver members need not be aligned in a substantially horizontal plane as shown in FIG. 3 but the louver members can be individually aligned in planes angular to the horizontal so as to achieve a high degree of control and direction of the reflected sunlight.

The pattern of arrangement of the Fresnel lens reflectors as shown in FIG. 8 can be reversed. With such reverse arrangement Fresnel lenses having ridges of greater angularity are carried by the lowermost louvers, with the angularity of the ridges of the Fresnel lenses decreasing on upper louver members. With this arrangement the sunlight is reflected at a more acute angle and is concentrated over a more limited ceiling area to provide an area of non-glare as illustrated by the cross-hatched area of FIG. 9.

In the case of venetian-type blinds of considerable length, a repeat pattern of Fresnel lenses can be used as is necessary. This repeat pattern affords good dispersion of the reflected sunlight due to the different angle of reflection because of the difference in position with respect to the sun between the top and bottom louvers.

The reflecting elements utilized in accordance with this invention can be formed of various materials such as metals, metal foils, laminates of paper and plastics with reflective material and the like. Thus, for example, the reflecting element can be formed of a metal which is reflective which is then embossed or crimped to form the Fresnel lens configuration. With the use of a material which is itself reflective on a blind louver, the rays of the sun are reflected from the surface of the lens facet 25*a* as shown in FIG. 10. Alternatively, suitable reflecting elements can be formed by applying a transparent plastic having the Fresnel configuration to a louver 12 having a mirrored surface 60 as shown in FIG. 11. With a transparent Fresnel shaped element secured or laminated to a mirrored surface louver, sunlight is refractively transmitted through the transparent Fresnel element and is reflected from the mirror surface 60 of the louver back through the Fresnel element 25 and angularly directed to the ceiling as illustratively shown in FIG. 12.

Figure 13:
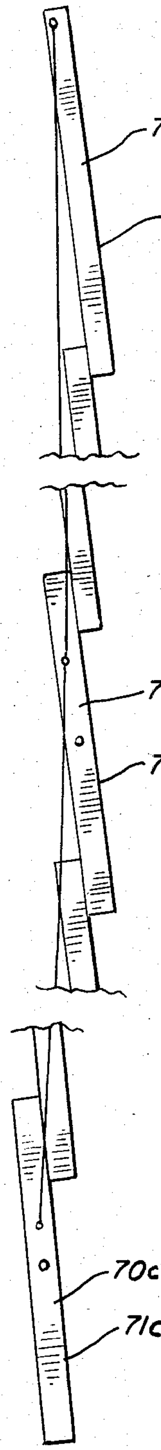
FIG. 13 is a fragmentary schematic view of an alternate embodiment of the invention showing several sunlight reflecting elements in closed position.
Figure 14:
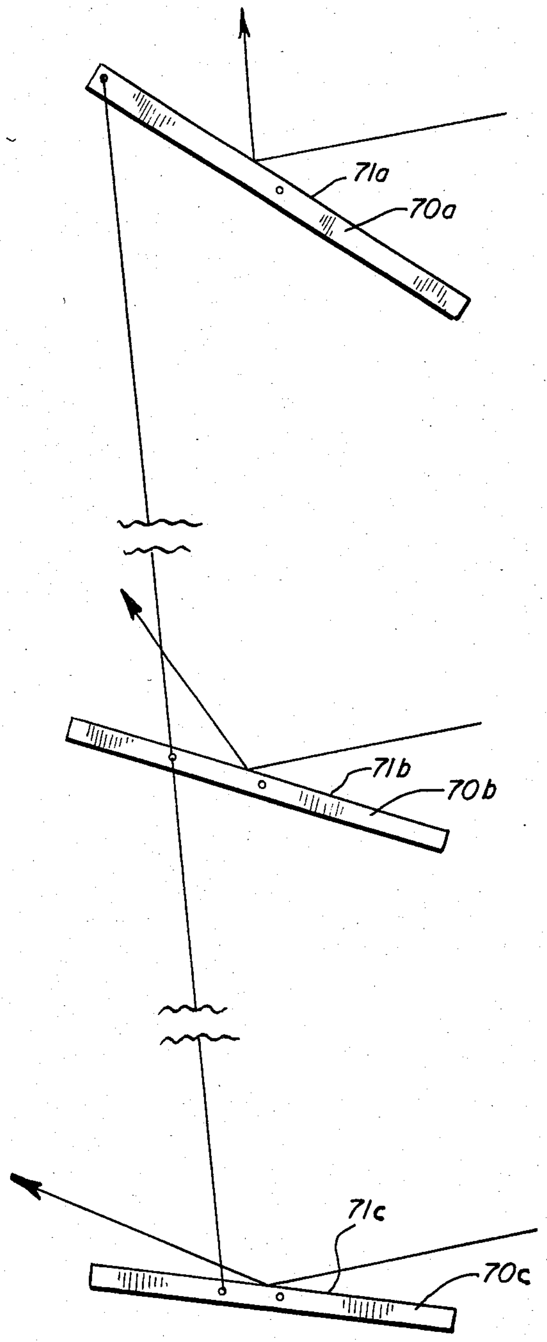
FIG. 14 is a view of the alternate embodiment of the invention of FIG. 13 showing the sunlight reflecting elements in open operative position.

According to a further alternate embodiment of the invention, the sunlight reflecting elements comprise a plurality of vertically spaced louver elements as in a conventional venetian blind. In this embodiment the top surface of the louvers are provided with a reflective top surface which conforms to the shape of the louver itself and is integral therewith. This is accomplished by laminating a reflective material on the upper surface of the louver or by fabricating the louver from a reflective material. To achieve distribution of reflected sunlight over a desired ceiling area in accordance with this embodiment, the louver members are pivotally held in a frame or holding means with the pivotal movement of the louvers being varied and controlled so that individual louvers can be opened to varied degrees. Thus, FIG. 13 is a fragmentary schematic view of a plurality of louver members 70*a*, 70*b* and 70*c* in closed position. The top surfaces 71*a*, 71*b* and 71*c* of the respective louvers are reflective to sunlight. The construction and design of the louvers is such that the individual louvers can be pivotally opened to lie in different planes with respect to the horizontal plane. Thus, as shown in FIG. 14, louver 70*a* can be opened to define a greater angle from the horizontal plane than louver 70*b*, which in turn can be opened to a greater angle from the horizontal plane than louver 70*c*, etc. In this way the sun rays striking each of the louvers 70*a*, 70*b* and 70*c* are reflected at a different angle to the ceiling providing an area of illumination distributed over a given ceiling area.

The angularity or pitch of the various louver members can be varied with, for example, the lower louver or slat members (70*c*) being pivotally opened to a greater angle from the horizontal plane than upper louvers 70*b* and 70*a*. In this way, light is reflected as illustrated in FIG. 9 to reduce glare.

The louvers or slats can have a planar or curved upper surface, although the particular angles of sunlight reflection will vary somewhat depending upon the planar configuration of the louvers. With this embodiment of the invention the degree or extent of opening of the louver or slat members must be limited and varied so that certain louver members open to an angular position different from other louvers in the series. This is in contrast to the embodiment of the invention described heretofore wherein separate light reflecting elements providing different angles of light reflectance are selectively attached to individual louver or slat members. This embodiment permits each of the louvers in the series to open to the same extent yet desired distribution of reflected light over a given target area can be achieved.

A further embodiment of the invention includes an arrangement of louver members as illustrated in FIGS. 13 and 14, which are adapted for differing pivotal movement to lie in different planes with respect to the horizontal plane. According to this latter embodiment, the top surfaces of the louver members are provided with Fresnel lens elements such that the facets of the lens elements on an individual louver are of identical pitch or angularity, but differ from the angularity of lens elements on other louver members. With this embodiment of the invention, individual louver members can be positioned, depending upon the pitch or angularity of the Fresnel lens facets thereon, so as to provide a greater field of vision therethrough.

When desired, louver members can be formed of a translucent material of desired transparency so as to permit some light to pass through the louver without being reflected from the louver or the reflecting elements carried thereby. With the combination of a translucent louver and reflective elements, adjustment of the amount of light which enters an enclosure directly can be achieved.

The present invention, as described in detail in the foregoing embodiments, is particularly useful to reduce energy costs by utilization of sunlight for illumination. However, the invention has broader application in that it can be used to controllably direct radiant light other than sunlight. Thus, the invention can be utilized to controllably direct radiant light from a lighted area to a non-lighted area, such as to direct radiant light from a lighted area to a desired non-lighted area, such as, by way of example, to direct radiant light from a building to an adjacent patio area. It will be apparent, therefore, that the present invention has wide applicability and advantage.

Those modifications and equivalents which fall within the spirit of the invention are to be considered a part thereof.

What is claimed is:

1. Apparatus for controllably directing radiant light comprising in combination (a) holding means for a plurality of Fresnel lens light reflective elements adapted to be positioned in the path of radiant light, (b) a plurality of Fresnel lens light reflective elements held by said holding means, said Fresnel lens light reflective elements having light reflective surfaces of differing angularity with respect to the horizontal plane so that light striking said reflective elements is reflected therefrom in different paths to a desired target area.

2. Apparatus for controllably directing radiant light comprising in combination (a) holding means for a plurality of Fresnel lens light reflective elements adapted to be positioned adjacent a building aperture penetrable by radiant light, (b) a plurality of Fresnel lens light reflective elements held by said holding means, said Fresnel lens light reflective elements having light reflective surfaces of differing angularity with respect to the horizontal plane so that light striking said reflective elements is reflected therefrom in different paths to a desired target area.

3. Apparatus for controllably directing incident sunlight within an enclosure comprising in combination (a) a frame holding a series of horizontally extending louver members and adapted to be positioned adjacent an aperture in a building enclosure through which sunlight enters the building, (b) a plurality of Fresnel lens light reflective elements on the top surfaces of said louver members, said Fresnel lens light reflective elements having light reflective surfaces of differing angularity with respect to the horizontal plane so that incident sunlight striking said reflective elements is reflected therefrom in different paths to a desired target surface within said enclosure.

4. Apparatus in accordance with claim 3 wherein the majority of Fresnel lens surfaces on an upper louver member have a greater degree of angularity with respect to the horizontal plane than the majority of Fresnel lens surfaces on a lower louver member.

5. Apparatus in accordance with claim 3 wherein the majority of Fresnel lens surfaces on a lower louver member have a greater degree of angularity with respect to the horizontal plane than the majority of Fresnel lens surfaces on an upper louver member.

6. Apparatus in accordance with claims 3, 4 or 5 wherein the apex of the facets of the Fresnel lenses points generally inwardly toward the enclosure.

7. Apparatus in accordance with claims 3, 4 or 5 wherein the apex of the facets of the Fresnel lenses points generally outwardly away from the enclosure.

8. Apparatus in accordance with claim 3 wherein the louver members are formed of a translucent material.

9. Apparatus in accordance with claim 3 wherein the louver members are pivotable about their axes to differing extent.

10. Apparatus in accordance with claim 3 wherein the bottom surface of the louvers carry a design.

11. Apparatus for controllably directing incident sunlight within an enclosure comprising in combination (a) holding means for a plurality of light reflective elements adapted to be positioned adjacent an aperture in a building enclosure through which sunlight enters the building, (b) a plurality of Fresnel lens light reflective elements held by said holding means, said light reflective elements having light reflective surfaces of differing angularity with respect to the horizontal plane so that incident sunlight striking said reflective elements is reflected therefrom in different paths to a desired target surface within said enclosure.

12. Apparatus for controllably directing incident sunlight within an enclosure comprising in combination (a) a frame holding a series of horizontally extending louver members and adapted to be positioned adjacent an aperture in a building enclosure through which sunlight enters the building, (b) a plurality of light reflective elements on the top surfaces of said louver members, said light reflective elements having light reflective surfaces of differing angularity with respect to the horizontal plane so that incident sunlight striking said reflective elements is reflected therefrom in different paths to a desired target surface within said enclosure.

13. Apparatus in accordance with claim 12 wherein the louver members are pivotable about their axes to differing extent.

14. Apparatus in accordance with claim 12 wherein the bottom surface of the louvers carry a design.

15. Apparatus in accordance with claim 12 wherein the louver members are formed of a translucent material.

* * * * *